United States Patent [19]

Toma

[11] Patent Number: 5,726,910
[45] Date of Patent: Mar. 10, 1998

[54] COLOR CORRECTING DEVICE

[75] Inventor: Takashi Toma, Saitama, Japan

[73] Assignee: Fuji Photo Film Co., Ltd., Kanagawa, Japan

[21] Appl. No.: 618,765

[22] Filed: Mar. 20, 1996

[30] Foreign Application Priority Data

Mar. 20, 1995 [JP] Japan ................................ 7-061317
Dec. 5, 1995 [JP] Japan ................................ 7-316983

[51] Int. Cl.$^6$ .............................. H04N 1/60; H04N 1/46
[52] U.S. Cl. ...................... 364/526; 358/518; 358/523
[58] Field of Search ......................... 364/526; 358/518, 358/519, 517, 523, 524, 515; 345/186, 153, 154; 382/167; 395/115

[56] References Cited

U.S. PATENT DOCUMENTS

| | | |
|---|---|---|
| 4,745,466 | 5/1988 | Yoshida et al. |
| 5,065,234 | 11/1991 | Hung et al. ................................ 358/80 |
| 5,157,483 | 10/1992 | Shoji et al. ................................ 358/75 |

FOREIGN PATENT DOCUMENTS 467389  3/1983  Japan .

*Primary Examiner*—Emanuel T. Voeltz
*Assistant Examiner*—Tony M. Cole

[57] ABSTRACT

A color correcting device effects color correction of designated color digital data (DMAIN0-DMAIN7) in consideration of two of reference color digital data (Din10-Din17, Din20-Din27). The designated color digital data is data of a designated one of three primary colors. The two of the reference color digital data are data of remaining two of the three primary colors. A first memory (43, 61-63) stores auxiliary data (DSUB0-DSUB9) of which an address is a respective combination of the two of the reference color digital data. A second memory (44, 64-66) stores corrected data (DiOUT0-DiOUT7) of the designated color, an address of the corrected data being a respective combination of the auxiliary data and the designated color digital data. A read controller (32) provides the first memory with the two of the reference color digital data, and provides the second memory with the auxiliary data read from the first memory and the designated color digital data, to read the corrected data of the designated color.

26 Claims, 7 Drawing Sheets

COLOR CORRECTING DEVICE

BACKGROUND OF THE INVENTION

1. Field of the Invention

The present invention relates to a color correcting device. More particularly, the present invention relates to a color correcting device for correction of a video signal of a color image with high reproductivity in printing of the image in a video printer.

2. Description Related to the Prior Art

A video printer is constructed to record a full-color image in accordance with a color video signal. The video signal is subjected to the masking treatment and gamma (Γ) correction, to heighten reproductivity of color and gradation. As is known in the art, the masking treatment is based on calculation effected by using Equations (1) or (2):

$$Y = fB \cdot B$$
$$M = fG \cdot G$$
$$C = fR \cdot R$$

where fB, fG and fR are operators or functions; or $$\begin{bmatrix} Y \\ M \\ C \end{bmatrix} = \begin{bmatrix} a11 & a12 & a13 \\ a21 & a22 & a23 \\ a31 & a32 & a33 \end{bmatrix} \begin{bmatrix} B \\ G \\ R \end{bmatrix} \quad (2)$$

where aij (i, j=1, 2, 3) is a coefficient.

Figure 9:
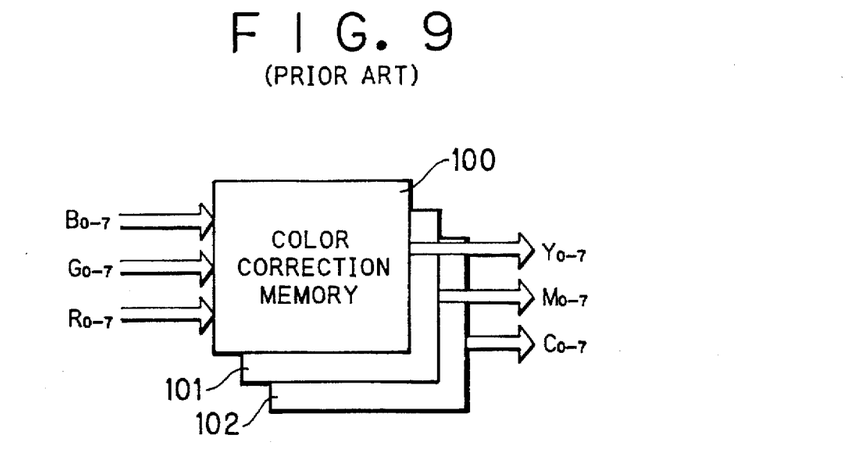
FIG. 9 is a block diagram illustrating color correction memories of a conventional color correction device.

When Equations (1) are used in the masking treatment, the reproductivity in printed color is lower than when Equation (2) is used, because of lower precision in color correction. When Equation (2) is used in the masking treatment, greater load in calculation is required than when Equations (1) are used. The use of Equation (2) is unadvantageous in longer time in the processing, need of larger capacity of calculating device, and thus higher manufacturing cost. To overcome those drawbacks, it is conceivable to use color correction memories 100-102 as illustrated in FIG. 9. Red, Green and Blue video signals of primary colors are digitally converted into 8-bit color digital data R0-R7, G0-G7 and B0-B7. The color correction memories 100-102 are addressed with the color digital data R0-R7, G0-G7 and B0-B7.

An address of the color correction memories 100-102 consists of a combination of the 8-bit color digital data R0-R7, G0-G7 and B0-B7. In memory areas to be addressed, combinations of color corrected data Y0-Y7, M0-M7 and C0-C7 are stored in the color correction memories 100-102. For effecting the masking treatment by use of the 8-bit data of Red, Green and Blue in full decoding, highly large capacity is inevitably required for the memories. Referring to FIG. 9, the color correction memory 100 has address data having a length of 24 bits. The color corrected data has 8 bits. The required memory capacity per one color is $2^{24} \times 8 = 2^{27}$ bits, namely 16 megabytes. The total of the three memories is 48 megabytes. If dynamic RAM of a widely available 4-megabit type is used, 96 dynamic RAM are required. It is impossible to simplify the construction of the memory.

JP-B 4-67389 (JP-A 59-161980) has a suggestion for using color correcting memories capable of reducing a memory capacity. The color correcting memories are data converting table memories, of which an address consists of a combination of color digital data of the three primary colors. In memory areas to be addressed, combinations of Yellow image data, Magenta image data and Cyan image data are stored as results of matrix calculation. To obtain Yellow data for example, Blue data is used as first color digital data to be corrected. Red and Green data are used as second and third color digital data. The number of digits of the second and third color digital data in use is reduced under that of the first color digital data. For example, 6 bits of the first color digital data are used while the 4 bits of the second and third color digital data are used.

Figure 10:
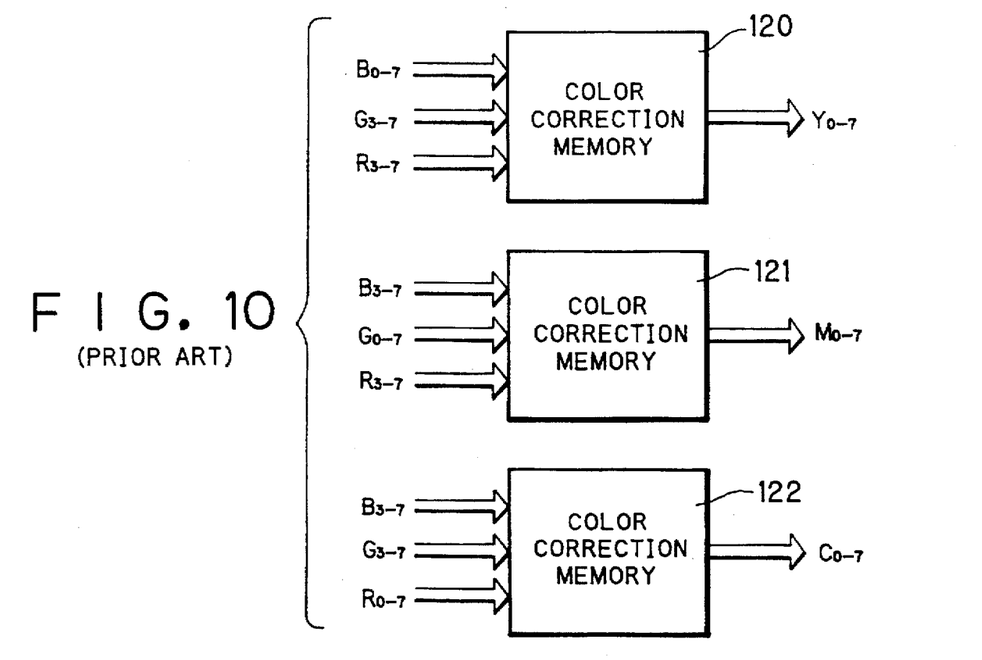
FIG. 10 is a block diagram illustrating color correction memories of another conventional color correction device.

It is therefore possible to prevent the table memory from having an enlarged capacity, to keep the manufacturing cost of the color correction device in a low level. In FIG. 10, a color correction memory 120 is used with the inputs of first color digital data B0-7 of the 8 bits, and second and third color digital data R3-R7 and G3-G7 of 5 bits, all of which derive of the 8-bit color digital data R0-R7, G0-G7 and B0-B7 in the same manner as FIG. 9. Similarly color correction memories 121 and 122 for Green and Red colors are constructed. Each of the color correction memories 120-122 has a memory capacity of $2^{21}$ bits, and their total has capacity of $3 \times 2^{21}$ bits. It is favorable that the color correcting device of FIG. 10 only has memory capacity 1/64 as great as that of the color correction memories 100-102 in FIG. 9.

When the number of digits of the second and third color digital data is reduced, color correction could be effected at a lost cost. However, precision in the color correction would be lowered. If memory cells are increased to heighten the precision in the correction, the manufacturing cost would be raised.

SUMMARY OF THE INVENTION

In view of the foregoing problems, an object of the present invention is to provide a color correcting device in which color correction can be effected both precisely and at a low cost.

In order to achieve the above and other objects and advantages of this invention, color correction of designated color digital data is effected in consideration of two of reference color digital data. The designated color digital data is data of a designated one of three primary colors. The two of the reference color digital data are data of remaining two of the three primary colors. A first memory stores auxiliary data of which an address is a respective combination of the two of the reference color digital data. A second memory stores corrected data of the designated color, an address of the corrected data being a respective combination of the auxiliary data and the designated color digital data. A read controller provides the first memory with the two of the reference color digital data, and provides the second memory with the auxiliary data read from the first memory and the designated color digital data, to read the corrected data of the designated color.

In a preferred embodiment, the read controller includes a device for generating a color selecting signal to select the designated color from the three primary color. There is a selector operable in response to the color selecting signal, for selecting the reference color digital data from the first to third color digital data, to provide the first memory therewith, and for selecting the designated color digital data from the first to third color digital data differently from the reference color digital data, to provide the second memory therewith.

The auxiliary data is adapted to weighting the first digital data for the color correction.

The first to third primary colors are red, green and blue, and the color corrected data is of yellow, magenta and cyan into which the red, green and blue are converted by complementary color conversion.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
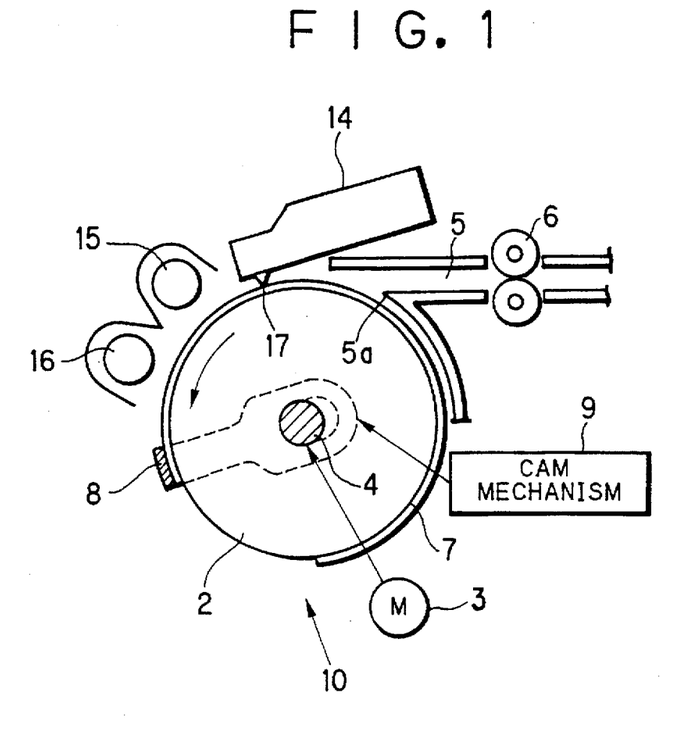
FIG. 1 is a schematic view illustrating a color thermal printer.

In FIG. 1, a color thermal printer is illustrated. A platen drum 2 is rotatable about a shaft 4, and driven by a stepping motor 3 to rotate in a direction indicated by the arrow for the time of printing. A color thermosensitive recording sheet 7 is fed through an entrance/exit 5 by a pair of conveying rollers 6, and fitted on a periphery of the platen drum 2. A front edge of the recording sheet 7 is retained by a clamper 8. The clamper 8 is controlled to open/close by a cam mechanism 9. A rotation assembly 10 for the recording sheet 7 is constituted by the platen drum 2, the stepping motor 3, the entrance/exit 5, the conveying rollers 6, the clamper 8 and the cam mechanism 9. Near to the platen drum 2, there are arranged a thermal head 14, a magenta fixing ultraviolet lamp 15, and yellow fixing ultraviolet lamp 16.

The bottom of the thermal head 14 has a heating element array 17, in which a great number of heating elements are arranged in line in a main scanning direction. Each of the heating elements consists of a resistor element, and applies bias heat energy and image heat energy to the recording sheet 7 for the thermal recording of one pixel. The bias heat energy is adapted to heating the recording sheet 7 to temperature slightly insufficient for coloring of the recording sheet 7. The image heat energy is associated with coloring density. The magenta fixing lamp 15 emits near ultraviolet rays peaking at about 365 nm. The yellow fixing lamp 16 emits near ultraviolet rays peaking at about 420 nm.

Figure 2:
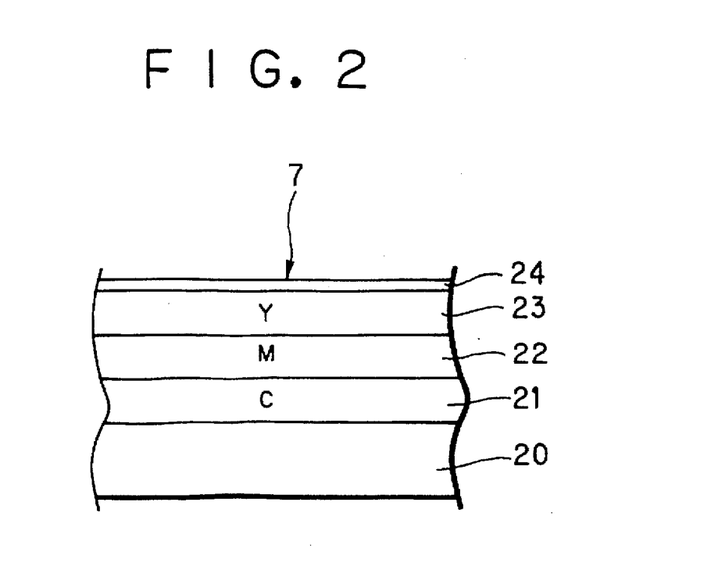
FIG. 2 is an explanatory view illustrating a layer structure of color thermosensitive recording material.

As illustrated in FIG. 2, the recording sheet 7 includes a support 20, a cyan thermosensitive coloring layer 21, a magenta thermosensitive coloring layer 22, a yellow thermosensitive coloring layer 23, and a protective layer 24. The magenta coloring layer 22 has optical fixability to near ultraviolet rays of about 365 nm. The yellow coloring layer 23 has optical fixability to near ultraviolet rays of about 420 nm. In FIG. 2, Y designates the yellow coloring layer 23, M designates the magenta coloring layer 22, and C designates the cyan coloring layer 21. As is not shown in FIG. 2, there are intermediate layers between the coloring layers 21–23 for adjusting the thermal sensitivity of the magenta coloring layer 22 and the cyan coloring layer 21. The support 20 is opaque and of coated paper or plastic film. It is possible for the printer to produce an OHP (overhead projector) sheet. For this, the support 20 is of transparent plastic film.

Figure 3:
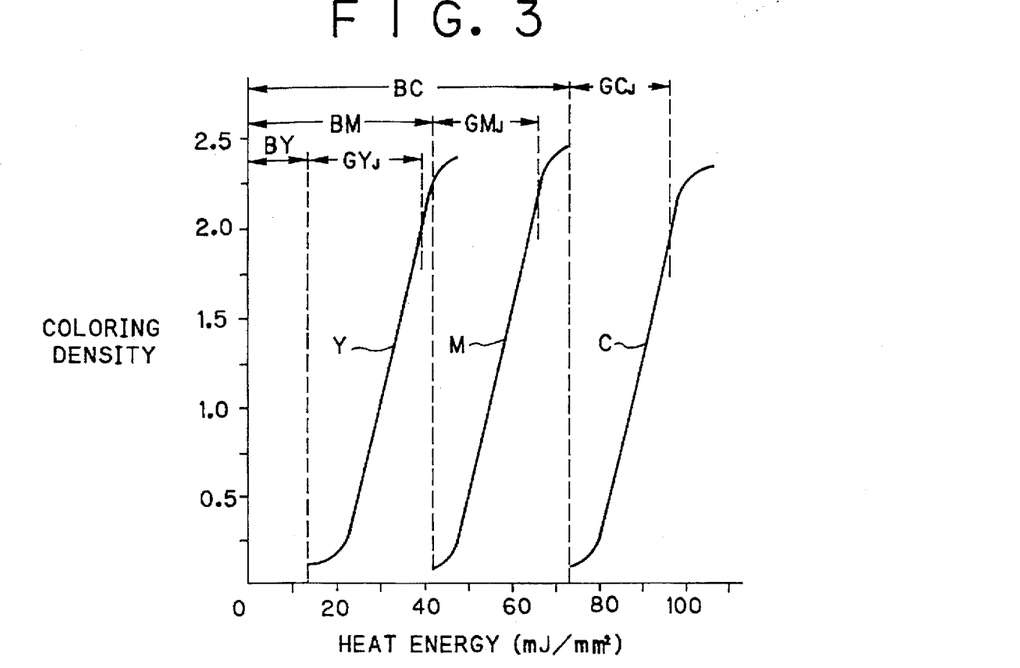
FIG. 3 is a graph illustrating a coloring characteristic of the recording material.

FIG. 3 illustrates coloring characteristics of the coloring layers. In the recording sheet 7, the yellow coloring layer 23 has the highest thermal sensitivity, namely requires lowest heat energy to be colored. The cyan coloring layer 21 has the lowest thermal sensitivity, namely requires highest heat energy to be colored. For a pixel to record the Yellow (Y) color, the recording sheet 7 is supplied with heat energy as a sum of the bias heat energy BY and the image heat energy $GY_J$. The bias heat energy BY is determined to heat the yellow coloring layer 23 to temperature slightly insufficient for coloring of the yellow coloring layer 23, and applied to the recording sheet 7 during the bias heating as an initial step of the recording of each pixel. The image heat energy $GY_J$ is determined according to a gradation level J corresponding to the coloring density of the pixel as designated, and is applied to the recording sheet 7 during the image heating. Similarly bias heat energy and image heat energy are defined also for the Magenta (M) and Cyan (C) colors, with similar signs.

Figure 4:
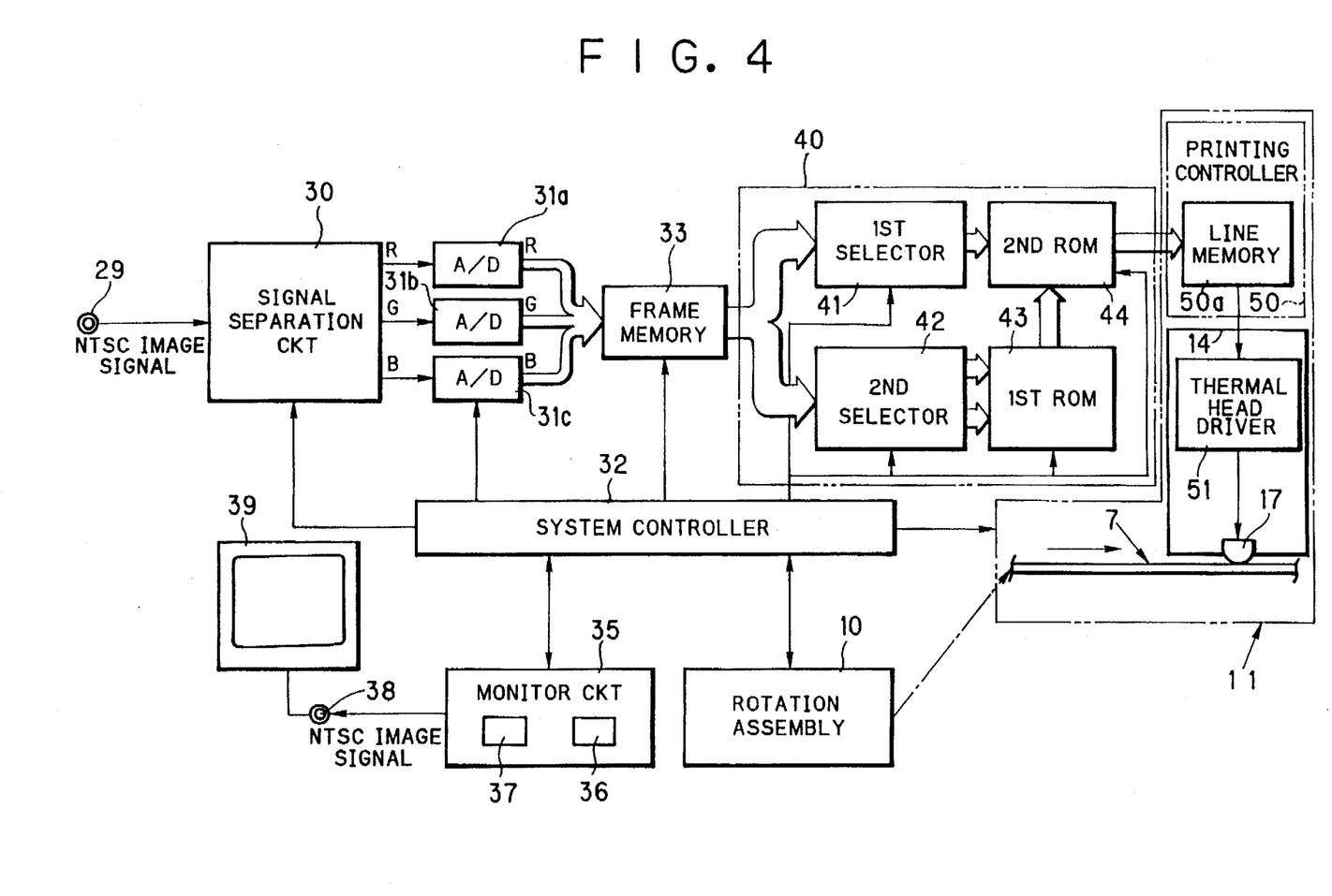
FIG. 4 is a block diagram illustrating electric circuits in the color thermal printer.

FIG. 4 illustrates electric circuits of the color thermal printer. An NTSC video signal from a video camera, a video deck, a television game machine or the like is input through an input terminal 29, and separated by a signal separation circuit 30 into a Red video signal (R), a Green video signal (G) and a Blue video signal (B). Analog/digital (A/D) converters 31a–31c convert the Red, Green and Blue video signals into 8-bit color digital data of the Red, Green Blue colors. When a write signal is generated by a system controller 32 by way of a read controller, the color digital data of the three colors of one frame are written to an image memory 33.

The system controller 32 consists of a microcomputer, which controls the rotation assembly 10 and a printing section 11 in sequential fashion, to record a color image to the recording sheet 7 according to image data in a form of a hard copy. Note that it is possible to input a video signal through an electronic still camera, a still video player, a personal computer and the like, instead of the video camera.

A monitor circuit 35 includes a digital/analog (D/A) converter 36 and an analog signal processor 37. The D/A convertor 36 converts the three-color image data into Red, Green and Blue signals of analog forms, which are converted by the analog signal processor 37 into an NTSC video signal. There is an output terminal 38 through which the NTSC video signal is output, and to which a monitor display 39, for example home-use television display, is connected. The monitor display 39 displays a frame image according to the NTSC video signal.

Figure 5:
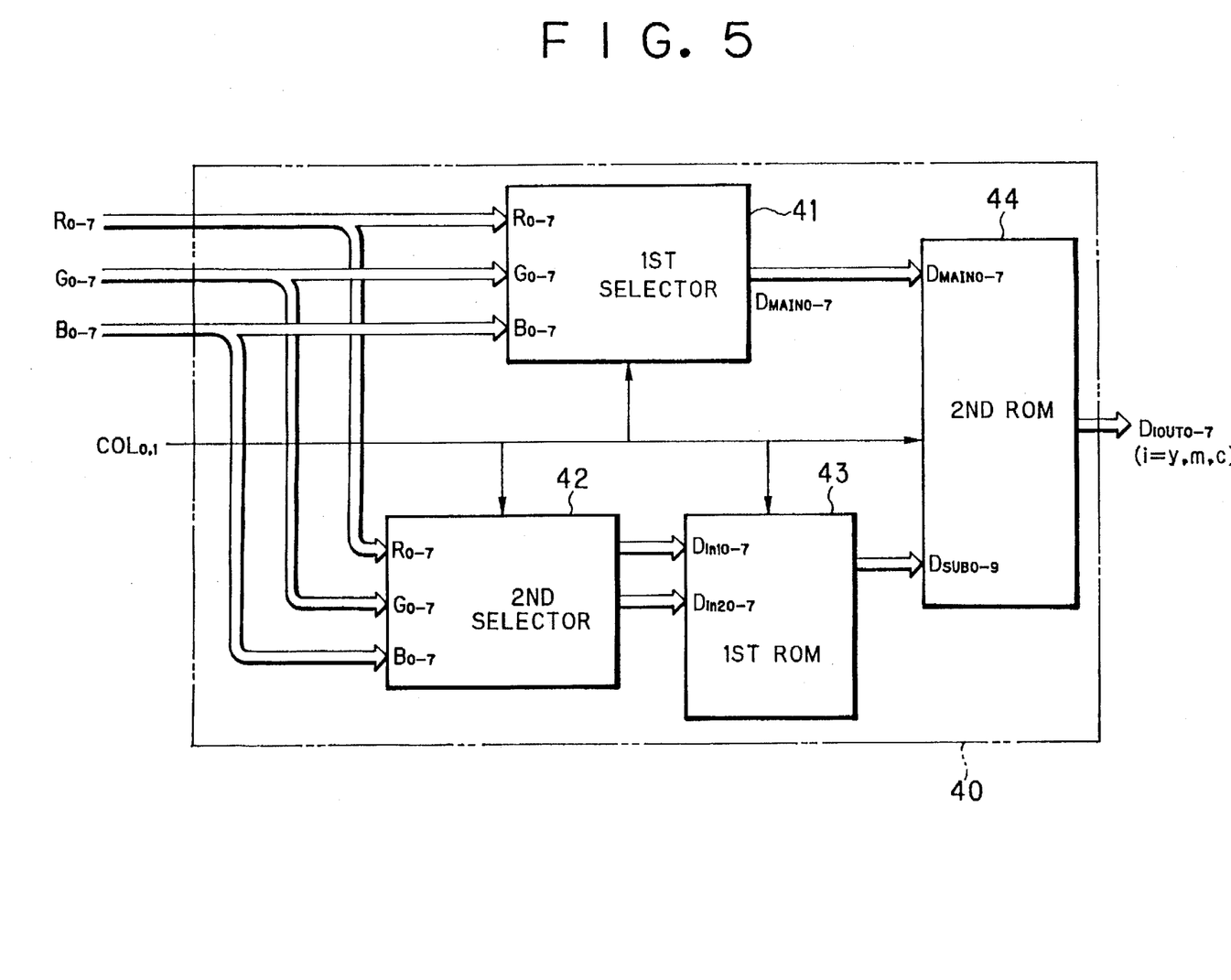
FIG. 5 is a block diagram illustrating a color correction device of the present invention.

As illustrated in FIG. 5, a data convertor circuit 40 is constituted by a first selector 41, a second selector 42, a first ROM 43 and a second ROM 44. The first ROM 43 is adapted to conversion into color correcting auxiliary data.

The second ROM 44 is adapted to conversion into color corrected data. The first and second selectors 41 and 42 receive inputs of 8-bit color digital data R0–R7, G0–G7 and B0–B7 of the Red, Green and Blue, and a 2-bit color selecting signal (COL0, COL1). The first selector 41 responds to the color selecting signal representing a first color, and sends only first color digital data to an address port of the second ROM 44. The second selector 42 responds to the color selecting signal representing the first color, and sends only the second and third color digital data to an address port of the first ROM 43, while excluding the first color represented by the color selecting signal.

The first ROM 43 stores 10-bit auxiliary data DSUB0–DSUB9. An address of the auxiliary data DSUB0–DSUB9 consists of a combination of the 2-bit color selecting signal (COL0, COL1) and second and third color digital data Din1–Din17 and Din20–Din27. The auxiliary data DSUB0–DSUB9 represents a weight to the first color digital data in color distribution based on the second and third color digital data.

The second ROM 44 stores color corrected data DiOUT0–DiOUT7 (=y, m, c). An address of the color corrected data DiOUT0–DiOUT7 consists of a combination of the auxiliary data DSUB0–DSUB9, first color digital data DMAIN0–DMAIN7, and the color selecting signal (COL0, COL1). The color corrected data DiOUT0–DiOUT7 represents a result of subjecting the first color digital data DMAIN0–DMAIN7 to a masking treatment and color conversion from Red, Green and Blue to Yellow, Magenta and Cyan.

In FIG. 4, when the system controller 32 addresses a first pixel of a first line and reads the image memory 33, 8-bit color digital data of the Red, Green and Blue from the image memory 33 are sent to the data convertor circuit 40. The data convertor circuit 40 effects data conversion with precision near to full decoding. The color corrected data DiOUT0–DiOUT7 output from the data convertor circuit 40 is written to a line memory 50a of a printing controller 50 in an associated memory area.

The printing section 11 is constituted of the printing controller 50, and a thermal head driver 51 incorporated in the thermal head 14. For the time of recording of the Yellow color, the printing controller 50 writes Yellow image data to the line memory 50a in a memory area associated with the first pixel. For recording of the Magenta or Cyan colors, the printing controller 50 writes similarly Magenta or Cyan image data to the line memory 50a. Also for the remaining pixel included in the first line, the printing controller 50 writes the image data to the line memory 50a in memory areas associated with those pixels.

The printing controller 50 reads one-line image data from the line memory 50a in consecutive fashion, compares the image data with comparative grade data one by one, and generates image drive data of a serial form. The image drive data has a "High" value for recording a color, and has a "Low" value for not recording any color. Before producing the image drive data, the comparative grade data is compared with one-line bias data, to generate bias drive data of a serial form based on the comparative grade data. The drive data of the serial forms is sent to the thermal head driver 51. A method, an apparatus and a technique for producing the bias drive data and image drive data in comparison with the comparative grade data are suggested in U.S. Ser. No. 08/262,333.

Figure 6:
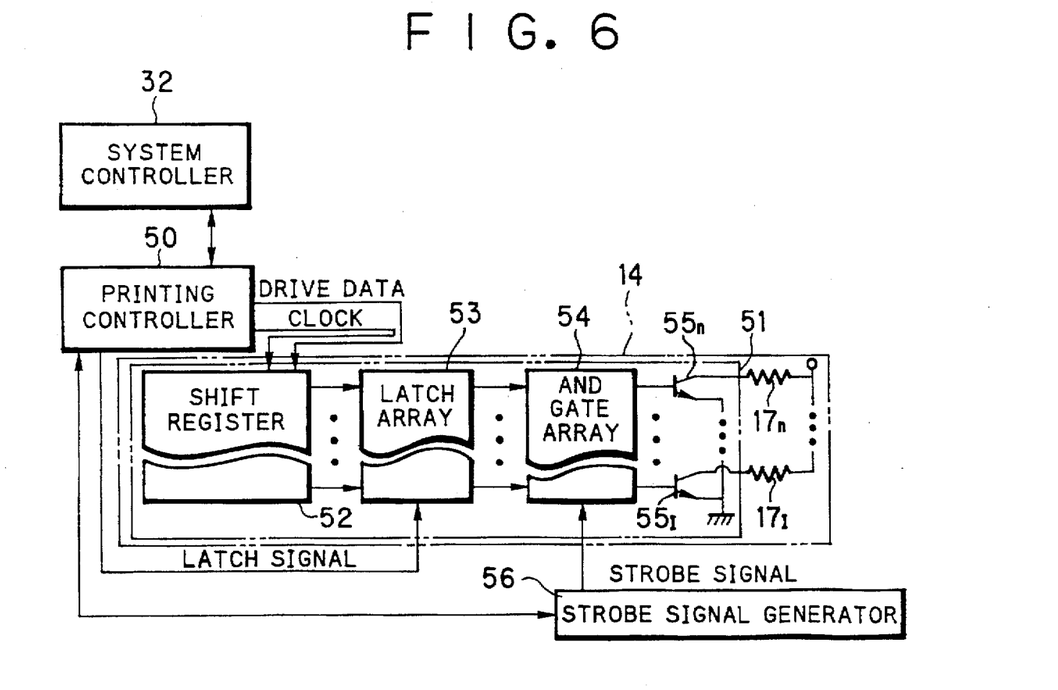
FIG. 6 is a block diagram illustrating a thermal head, a printing controller and circuits relevant thereto.

In the thermal head driver 51 as illustrated in FIG. 6, a shift register 52 shifts serial drive data according to the clock signal, and converts the serial drive data into a parallel form. The drive data in the parallel form is latched in a latch array 53 in synchronism with a latch signal. While a strobe signal is being sent from a strobe signal generator 56 to an AND gate array 54, each output of the AND gate array 54 goes "High" if the drive data goes "High". The outputs of the AND gate array 54 are connected to respective bases of transistors 551-55n, each of which is turned on when an associated output of the AND gate array 54 goes "High". The transistors 551-55n are connected to respective heating elements 171-17n, which are driven to develop density in association with image data. Then the rotation assembly 10 is controlled to rotate the platen drum 2 intermittently at a predetermined amount, to move the recording sheet 7 as much as one line. Similarly successive lines are thermally recorded by the printing section 11 and the rotation assembly 10.

Operation of the color thermal printer is described now. In FIG. 1, the thermal head 14 has a position away from the platen drum 2. The clamper 8 has an open position and stopped near to the heating element array 17 of the thermal head 14. The front edge of the recording sheet 7, while moved by the conveying rollers 6 to the platen drum 2, passes through the clamper 8. Then the clamper 8 is closed. The platen drum 2 starts being rotated. After the start of the rotation, the thermal head 14 is pressed against the platen drum 2 by a pressing mechanism not shown.

The heating elements 171-17n of the thermal head 14 are positioned at a front edge of a recording area of the recording sheet 7. The system controller 32 starts thermally recording the Yellow color. The system controller 32 first addresses the first pixel of the first line, reads the 8-bit color digital data R0–R7, G0–G7 and B0–B7 from an addressed memory area, and sends them to the first and second selectors 41 and 42 of the data convertor circuit 40. Also the system controller 32 sets a binary value "01" as the color selecting signal (COL0, COL1), and sends it to the first and second selectors 41 and 42 and the first and second ROMs 43 and 44. Note that the color selecting signal (COL0, COL1) is set as "01" for the Yellow recording, "10" for the Magenta recording, and "11" for the Cyan recording. The system controller 32 sends a lead signal to the data convertor circuit 40, where, in FIG. 5, the second selector 42 allows inputting the color digital data R0–R7 and G0–G7 to the first ROM 43 by way of the second and third color digital data Din10–Din17 and Din20–Din27 in view of the Yellow recording. The first selector 41 allows inputting the color digital data B0–B7 to the second ROM 44 by way of the first color digital data DMAIN0–DMAIN7.

In the first ROM 43, a combination of R0–R7 or G0–G7 and the color selecting signal (COL0, COL1) is addressed, to read the auxiliary data DSUB0–DSUB9 from the associated memory area, and sends them to an address port of the second ROM 44. In the second ROM 44, a combination of B0–B7, the auxiliary data DSUB0–DSUB9 and the color selecting signal (COL0, COL1) is addressed, to read the color corrected data DyOUT0–DyOUT7 from the associated memory area. As illustrated in FIG. 4, the system controller 32 writes the color corrected data DyOUT0–DyOUT7 to the line memory 50a in a memory area of the first pixel. For the remaining pixels of the first line, the corrected data is written to the line memory 50a.

The printing controller 50 generates drive data for the heating elements 171-17n in accordance with image data in the line memory 50a, and sends the drive data to the thermal head driver 51. The thermal head driver 51 drives the heating elements 171-17n in accordance with the drive data. As is known in the art, the bias heating is effected for temperature slightly insufficient for color development, before the image heating is effected. This being so, the first line of the yellow image is thermally recorded at density associated with the drive data. Similarly remaining lines of the yellow image are recorded line after line.

As illustrated in FIG. 1, a portion with a yellow image recorded comes to the yellow fixing lamp 16, which fixes the yellow coloring layer 23 of the portion. Diazonium salt compounds remaining in the yellow coloring layer 23 are optically decomposed to lose coloring ability.

When the platen drum 2 makes one rotation to move the front edge of the recording area of the recording sheet 7 to the heating elements of the thermal head 14, a first line of the magenta image starts being recorded. A binary value "10" is set as the color selecting signal (COL0, COL1). The color digital data R0–R7, G0–G7 and B0–B7 are input to the data convertor circuit 40 as addresses. The color corrected data DmOUT0–DmOUT7 after the matrix calculation and the color conversion is output by the data convertor circuit 40 from an addressed memory area, and written to the line memory 50a in the printing controller 50. According to the data in the line memory 50a, the Magenta color is recorded. Similarly remaining lines of the Magenta image are recorded line after line. The portion with the Magenta image recorded comes to the magenta fixing lamp 15, which fixes the magenta coloring layer 22 of the portion. Diazonium salt compounds remaining in the magenta coloring layer 22 is optically decomposed to lose coloring ability.

Similarly a cyan image is recorded to the cyan coloring layer 21. In the Cyan recording, the color selecting signal (COL0, COL1) is "11" The color corrected data DcOUT0–DcOUT7 after the matrix calculation and the color conversion is output by the data convertor circuit 40, and written to the line memory 50a in the printing controller 50. According to the data in the line memory 50a, the Cyan color is recorded. At the finish of the recording to the cyan coloring layer 21, the platen drum 2 is rotated in reverse. A rear edge of the recording sheet 7 is guided by a separator claw 5a into the entrance/exit 5. The recording sheet 7 after the color recording is exited to a receptacle tray (not shown) by reverse rotation of the conveying rollers 6.

Typical results of the data conversion in the present embodiment are indicated later in Table 1 in comparison with the prior art such as JP-B 4-67389. Data in Table 1 are indicated in the hexadecimal notation (referred to as hexa code). In the prior art, a color correction memory 120 in FIG. 10 is used. The first color digital data of the first color to be corrected has 8 bits of B0–B7. The second and third color digital data used in the correction have 5 bits of R3–R7 and G3–G7. Color corrected data has 8 bits of Y0–Y7. In the present invention on the contrary, the first color digital data of the first color to be corrected have 8 bits of B0–B7. The second and third color digital data used in the correction have 8 bits of R0–R7 and G0–G7. The output of the first ROM 43 has 10 bits of the auxiliary data DSUB0–DSUB9. The output of the second ROM 44 has 8 bits of the color corrected data Y0–Y7.

In the prior art, upper 5 bits of the second and third color digital data are used for the color correction, but the lower 3 bits are not. Outputs after the color correction change every 8 grades. In the present invention however, the correcting auxiliary data is determined to address areas of the same first color corrected data after fully decoding the second and third color digital data. As is understood from Table 1 and FIG. 7A, degrees of freedom in determining points of changing outputs are greater in the present invention than in the prior art, so that the color can be corrected more finely.

TABLE 1

| Color digital data | | | Color correction | Color corrected data | |
|---|---|---|---|---|---|
| | | | auxiliary data | Present invention | Prior art |
| B0–B7 | G0–G7 | R0–R7 | DSUB0–DSUB9 | DyOUT0–DyOUT7 | DyOUT0–DyOUT7 |
| 52 | B6 | F6 | 0F8 | 50 | 50 |
| 52 | B7 | F6 | 0F9 | 50 | 50 |
| 52 | B8 | F6 | 0F9 | 50 | 51 |
| 52 | B9 | F6 | 0F9 | 50 | 51 |
| 52 | BA | F6 | 0F9 | 50 | 51 |
| 52 | BB | F6 | 0FA | 51 | 51 |
| 52 | BC | F6 | 0FA | 51 | 51 |
| 52 | BD | F6 | 0FA | 51 | 51 |
| 52 | BE | F6 | 0FA | 51 | 51 |
| 52 | BF | F6 | 0FA | 51 | 51 |
| . | . | . | . | . | . |
| . | . | . | . | . | . |
| . | . | . | . | . | . |
| 52 | B6 | F7 | 12C | 52 | 52 |
| 52 | B7 | F7 | 12C | 52 | 52 |
| 52 | B8 | F7 | 12C | 52 | 53 |
| 52 | B9 | F7 | 12C | 52 | 53 |
| 52 | BA | F7 | 12D | 53 | 53 |
| 52 | BB | F7 | 12D | 53 | 53 |
| 52 | BC | F7 | 12D | 53 | 53 |
| 52 | BD | F7 | 12D | 53 | 53 |
| 52 | BE | F7 | 12D | 53 | 53 |
| 52 | BF | F7 | 12E | 54 | 53 |
| . | . | . | . | . | . |
| . | . | . | . | . | . |
| . | . | . | . | . | . |
| 52 | B6 | FD | 12F | 55 | 55 |
| 52 | B7 | FD | 130 | 56 | 55 |
| 52 | B8 | FD | 130 | 56 | 56 |
| . | . | . | . | . | . |
| . | . | . | . | . | . |
| . | . | . | . | . | . |

Figure 7A:
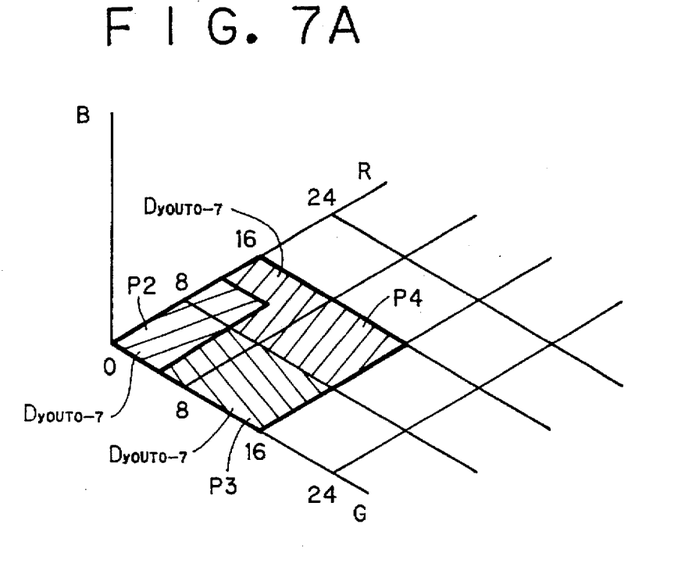
FIG. 7A is an explanatory view illustrating a relationship between input color digital data and output color corrected data according to the present invention.
Figure 7B:
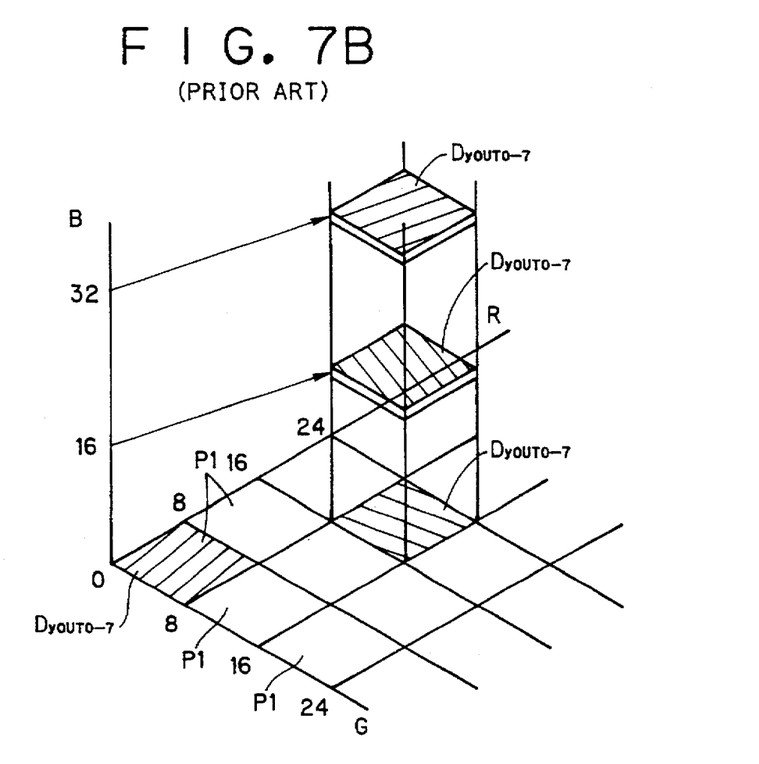
FIG. 7B is an explanatory view illustrating a relationship between input color digital data and output color corrected data according to the prior art.

FIG. 7A illustrates the degrees of freedom in determining the change points. Hatched portions are areas to which the color corrected data DyOUT0–DyOUT7 is written. In the prior art, the whole of a region defined by the R- and G-axes is split into 1024 areas P1, as 1024=32×32. The color corrected data DyOUT0–DyOUT7 is written to the regularly arranged areas P1. In the prior art, the color corrected data DyOUT0–DyOUT7 to be output changes only when the second and third color digital data R and G are changed by 8 grades of gradation. In the present invention of FIG. 7A on the other hand, the second and third color digital data R and G are fully decoded. The whole of the region defined by the R- and G-axes is split into 65536 points, as 65536=256×256. The 10-bit auxiliary data is assigned to those points, so that the whole region is split into 1024 areas P2, P3, P4 and so on. It is possible to change shapes and sizes of the areas P2, P3, P4 and so on in dependency on the assignment of the auxiliary data DSUB0–DSUB9. The color corrected data DyOUT0–DyOUT7 is written to the differently formed areas P2, P3, P4 and so on. In Table 1 for example, the color digital data G0–G7 as input changes from B9 to BF (hexadecimal) while the color corrected data is changed. Only the change by 5 grades can cause the color corrected data to change according to the present invention, in contrast with the prior art where a change in the color digital data G0–G7 by 8 grades is required to change the color corrected data. Accordingly the present invention is advantageous in finer color correction than the prior art. Note that only a few portions are hatched in FIGS. 7A and 7B. Other areas have similar arrangement.

Figure 8:
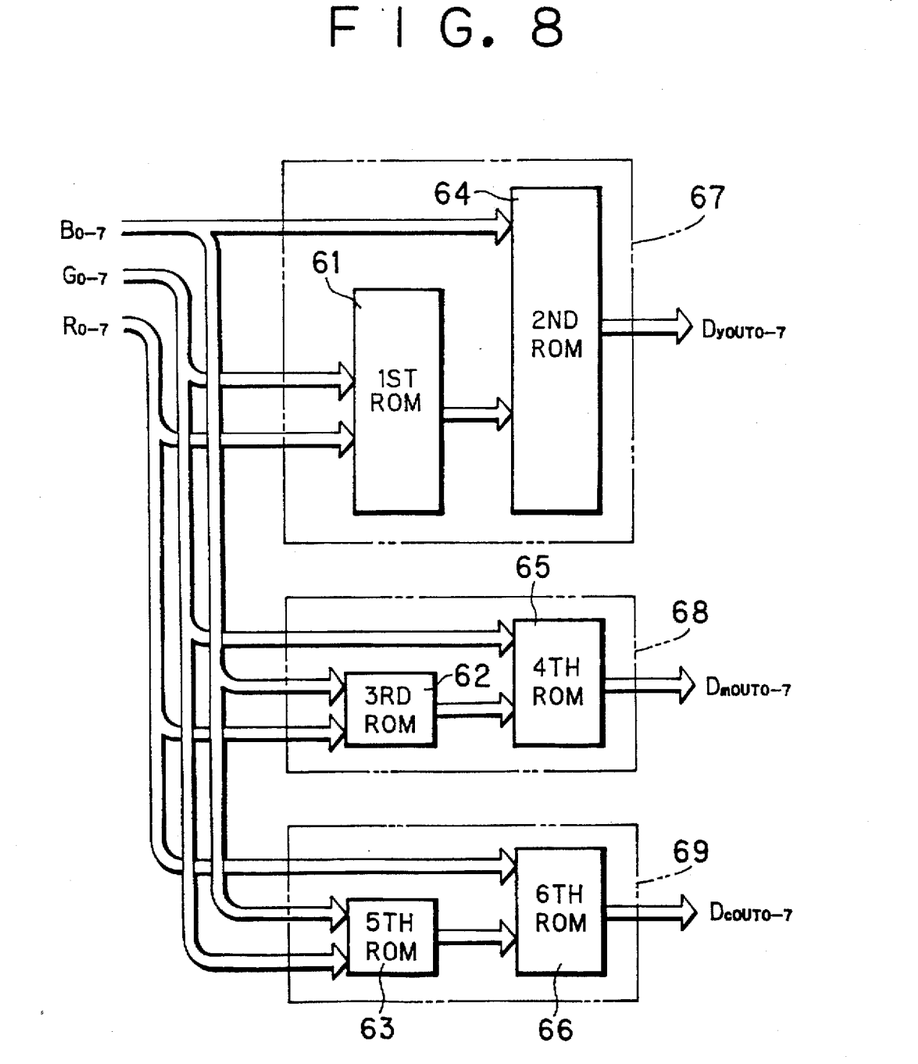
FIG. 8 is a block diagram illustrating another preferred color correction device.

In the above embodiment, the first and second selectors 41 and 42 are used to separate the first color digital data from the second and third color digital data, before being sent to the first and second ROMs 43 and 44. However it is possible to use a single selector operable in place of the first and second selectors 41 and 42. As illustrated in FIG. 8, it is also possible to use three data converter circuits 67–69 respectively for the primary colors. A first ROM 61 and a second ROM 64 cooperate for the Yellow correction. A third ROM 62 and a fourth ROM 65 cooperate for the Magenta correction. A fifth ROM 63 and a sixth ROM 66 cooperate for the Cyan correction. The first, third and fifth ROM 61–63 are adapted to conversion into color correcting auxiliary data. The second, fourth and sixth ROM 64–66 are adapted to conversion into color corrected data.

In the above embodiment, the first ROM 43 stores the 10-bit auxiliary data DSUB0–DSUB9. It is possible for a first ROM to use auxiliary data of another number of bits. If auxiliary data has a greater number of bits, it is possible to effect the matrix calculation and conversions with raised precision, despite requirement of a greater number of memory cells in use. If auxiliary data has a greater number of bits, it is possible to use a reduced number of memory cells, despite lower precision in the matrix calculation and conversions. In the above embodiment, the first, second and third color digital data of the Red, Green Blue colors have the number of digits of 8 bits. However the number of digits of the color digital data may be changed. The present invention is applicable to a construction to use upper bits of the second and third color digital data without using their lower bits, for example, use G1–G7 without using G0, or use G2–G7 without using G0 and G1. This makes it possible to use a still smaller number of memory cells.

In the above embodiments, three characteristics for representing one of various colors in a full-color fashion are Red data, Green data and Blue data. Combinations of characteristics of other notation system of colors may used instead: for example, the XYZ notation system, the three-characteristic notation system of HVC (hue-value-chroma) known as Munsell notation system, the DIN (Deutsche Industrie-Norm) notation system, and the Ostwald notation system. In the above, the second ROM 44 stores the result of subjecting the color digital data to the masking treatment and color conversion from Red, Green and Blue to Yellow, Magenta and Cyan. However a second ROM may store a result of subjecting the color digital data to the masking treatment in matrix calculation, without effecting color conversion from Red, Green and Blue to Yellow, Magenta and Cyan. It is possible to the second ROM to store the result of converting the color digital data further in consideration of gamma (Γ) correction.

The present invention is applicable to a color correcting device in which a second ROM stores a result of subjecting Yellow, Magenta and Cyan color digital data to the masking treatment and color conversion from Yellow, Magenta and Cyan to Red, Green and Blue. Also a second ROM may store a result of subjecting the Yellow, Magenta and Cyan color digital data to the masking treatment in matrix calculation, without effecting color conversion.

The present invention applicable to any video printer in which image data is converted to an image on a hard copy: for example, thermal transfer printers of a sublimation type and a wax transfer type, an ink jet printer, a video printer including a CRT or liquid crystal display panel for exposing photosensitive material, and a laser beam printer.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A color correcting device for color correction of designated color digital data in consideration of two of reference color digital data, said designated color digital data being data of one of three primary colors, said two of reference color digital data being data of the remaining two primary colors, said color correcting device comprising:

a first memory for storing auxiliary data of which an address is a respective combination of said two of reference color digital data;

a second memory for storing corrected data of said designated color, an address of said corrected data being a combination of said auxiliary data and said designated color digital data; and a read controller for providing said first memory with said two of reference color digital data, and for providing said second memory with said auxiliary data read from said first memory and said designated color digital data, to read said corrected data of said designated color.

2. A color correcting device as defined in claim 1, wherein said color digital data comprises first, second, and third color digital data of said three primary colors;

said combination of said two of reference color digital data includes a combination of said second and third color digital data, a combination of said first and third color digital data, and a combination of said first and second color digital data;

said auxiliary data includes first, second, and third auxiliary data;

said first memory stores said first auxiliary data of which an address is said combination of said second and third color digital data, said second auxiliary data of which an address is said combination of said first and third color digital data, and said third auxiliary data of which an address is said combination of said first and second color digital data;

said corrected data of said designated color comprises first, second, and third color corrected data; and said second memory stores said first color corrected data of which an address is a combination of said first auxiliary data and said first color digital data, said second color corrected data of which an address is a combination of said second auxiliary data and said second color digital data, and said third color corrected data of which an address is a combination of said third auxiliary data and said third color digital data.

3. A color correcting device as defined in claim 1, wherein said read controller includes:

a device for generating a color selecting signal to select said designated color from said three primary colors; and a selector, operable in response to said color selecting signal, for selecting said two reference color digital data from said first, second, and third color digital data and for selecting said designated color digital data from said first, second, and third color digital data differently from said two reference color digital data.

4. A color correcting device as defined in claim 1, wherein said color digital data includes first, second and third color digital data of said three primary colors;

said combination of said two reference color digital data includes a combination of said second and third color digital data, a combination of said first and third color digital data, and a combination of said first and second color digital data;

said auxiliary data comprises first, second, and third auxiliary data;

said first memory stores said first auxiliary data of which an address is said combination of said second and third color digital data;

said corrected data of said designated color comprises first, second, and third color corrected data;

said second memory stores said second color corrected data of which an address is a combination of said first auxiliary data and said first color digital data;

said color correcting device further comprising:

a third memory for storing said second auxiliary data of which an address is said combination of said first and third color digital data;

a fourth memory for storing said second color corrected data of which an address is a combination of said second auxiliary data and said second color digital data;

a fifth memory for storing said third auxiliary data of which an address is said combination of said first and second color digital data; and a sixth memory for storing said third color corrected data of which an address is a combination of said third auxiliary data and said third color digital data.

5. A color correcting device as defined in claim 1, wherein said auxiliary data is adapted to weighting said first digital data for said color correction.

6. A color correcting device as defined in claim 1, wherein said three primary colors are red, green and blue, and said color corrected data is one of yellow, magenta and cyan into which said red, green and blue are converted by complementary color conversion.

7. An apparatus for converting original color values into an output color value comprising:

control means for selecting an output color and for designating one of the original color values to correspond to the selected output color;

auxiliary data storage means for storing auxiliary color correction data;

auxiliary color correction data retrieval means for retrieving auxiliary color correction data from said auxiliary data storage means based on a plurality of the original color values not designated by said control means;

output value storage means for storing output color values; and output color retrieval means for retrieving from said output value storage means an output color value for the selected output color based on the retrieved auxiliary color correction data and the designated original color value.

8. The apparatus of claim 7, wherein the auxiliary color correction data retrieval means retrieves auxiliary color correction data based on two original color values not designated by said control means.

9. The apparatus of claim 8, wherein said control means further selects a second output color, designates a second original color value to correspond to the second selected output color, selects a third output color, and designates a third original color value to correspond to the third selected output color;

said auxiliary color correction data retrieval means retrieves second auxiliary color correction data based on the two original color values not designated to correspond to the second selected output color, and retrieves third auxiliary color correction data based on the two original color values not designated to correspond to the third selected output color; and said output color retrieval means retrieves a second output color value for the second selected output color based on the second auxiliary color correction data and the second designated original color value, and retrieves a third output color value for the third selected output color based on the third auxiliary color correction data and the third designated original color value.

10. The apparatus of claim 9 wherein said auxiliary data storage means includes a first memory for storing auxiliary color correction data for the first selected output color;

a second memory for storing auxiliary color correction data for the second selected output color; and a third memory for storing auxiliary color correction data for the third selected output color.

11. The apparatus of claim 10 wherein said output value storage means includes a fourth memory for storing output color values for the first selected output color;

a fifth memory for storing output color values for the second selected output color; and a sixth memory for storing output color values for the third selected output color.

12. The apparatus of claim 8, wherein said auxiliary data storage means is addressed by combining a data value representing the selected output color and the two original color values not designated to correspond to the selected output color.

13. The apparatus of claim 7, wherein each original color value is an 8-bit digital value.

14. The apparatus of claim 7, wherein each auxiliary color correction data is a 10-bit digital value.

15. The apparatus of claim 7, wherein said original color values respectively represent Red, Green, and Blue color levels.

16. The apparatus of claim 7, wherein said output color value represents one of Yellow, Cyan, and Magenta color levels.

17. A method for converting original color values into an output color value comprising the steps of:

(a) selecting an output color;

(b) designating one of the original color values to correspond to the selected output color;

(c) retrieving auxiliary color correction data based on a plurality of original color values not designated in step (b);

(d) reading out a color value for the selected output color based on the retrieved auxiliary color correction data and the designated original color value.

18. The method of claim 17, further comprising the steps of:

(e) selecting a second output color; and (f) repeating steps (b)-(d) for the second selected output color.

19. The method of claim 18, further comprising the steps of:

(g) selecting a third output color; and (h) repeating steps (b)-(d) for the third selected output color.

20. The method of claim 19, wherein the auxiliary color correction data is retrieved from a different memory unit for the first, second, and third selected output colors.

21. The method of claim 17, wherein the auxiliary color correction data is retrieved based on two original color values not designated in step (b).

22. The method of claim 21, wherein the auxiliary color correction data is retrieved using an address created by combining a data value representing the selected output color and the two original color values not designated in step (b).

23. The method of claim 17, wherein each original color value is an 8-bit digital value.

24. The method of claim 17, wherein each auxiliary color correction data is a 10-bit digital value.

25. The method of claim 17, wherein the original color values represent Red, Green, and Blue color levels.

26. The method of claim 17, wherein the output color value is one of Yellow, Cyan, and Magenta color levels.

* * * * *